United States Patent [19]

Koster

[11] Patent Number: 5,373,880
[45] Date of Patent: Dec. 20, 1994

[54] METHOD OF CONTINUOUSLY PROCESSING CHOPSTICKS AS WELL AS AN APPARATUS FOR CARRYING OUT THE METHOD

[75] Inventor: Ole Koster, Roskilde, Denmark

[73] Assignee: Stormax International A/S, Lynge, Denmark

[21] Appl. No.: 66,113

[22] PCT Filed: Dec. 5, 1991

[86] PCT No.: PCT/DK91/00381
§ 371 Date: Jun. 4, 1993
§ 102(e) Date: Jun. 4, 1993

[87] PCT Pub. No.: WO92/10342
PCT Pub. Date: Jun. 25, 1992

[30] Foreign Application Priority Data

Dec. 5, 1990 [DK] Denmark .............. 2896/90

[51] Int. Cl.[5] .................. B27C 1/12; B27C 5/00
[52] U.S. Cl. .................. 144/363; 144/3 R; 144/134 R; 144/136 R; 144/242 C; 144/247; 144/249 R; 144/368; 144/369; 198/782
[58] Field of Search .............. 198/780, 782, 785; 144/1 R, 3 R, 134 R, 136 R, 242 R, 242 C, 242 E, 246 R, 246 A, 246 G, 247, 249 R, 249 A, 363, 367, 368, 369

[56] References Cited

U.S. PATENT DOCUMENTS

| | | | |
|---|---|---|---|
| 1,302,717 | 5/1919 | Sawyer | 144/247 |
| 2,030,527 | 2/1936 | Meyer | 144/247 |
| 2,705,981 | 4/1955 | Smith | 144/246 R |
| 2,819,744 | 1/1958 | Chuet et al. | 144/247 |
| 3,742,992 | 7/1973 | McMillan | 144/246 R |
| 3,990,568 | 11/1976 | Wilson, Sr. | 144/246 G |
| 4,840,208 | 6/1989 | Schultz | 144/367 |
| 4,951,725 | 8/1990 | Schultz | 144/242 C |

*Primary Examiner*—W. Donald Bray
*Attorney, Agent, or Firm*—Pollock, Vande Sande & Priddy

[57] ABSTRACT

A method of continuously processing chopsticks (35), the outer shape of which is defined by two mutually parallel surfaces and two opposing, plane, oblique surfaces (5, 6) inclining towards one another by the same inclination seen relative to a common plane of symmetry. The chopsticks (35) are advanced in the longitudinal direction while passing pairs of processing implements (37, 38 and 39). During the advancing movement, one oblique surface (5) of the chopsticks (35), the common longitudinal plane of symmetry, and the second oblique surface (6) are aligned one by one substantially parallel to a common plane of alignment (50) extending in the direction of advance (36) and are processed by a pair of processing implements (37, 38 and 39) associated with each aligning position. The advance is carried out by continuously rotating friction rolls (8 to 34) engaging the mutually parallel surfaces of the articles.

9 Claims, 7 Drawing Sheets

Fig. 8

METHOD OF CONTINUOUSLY PROCESSING CHOPSTICKS AS WELL AS AN APPARATUS FOR CARRYING OUT THE METHOD

TECHNICAL FIELD

The invention relates to a method of continuously processing elongated articles, such as coherent pairs of chopsticks, the outer shape of which is defined by two mutually parallel surfaces and two opposing, plane, oblique surfaces inclining towards one another by the same inclination seen relative to a common plane of symmetry, by which method the articles are advanced in the longitudinal direction while passing pairs of processing implements. The invention also relates to an apparatus for carrying out the method.

BACKGROUND OF THE INVENTION

DK-PS No. 155,697 discloses a method of processing chopsticks produced in coherent pairs, the pairs being coherent only for a short distance along abutting surfaces. When the chopsticks are to be used, the user merely breaks the coherent portion. During processing, the chopsticks are continuously advanced through a processing apparatus along a track, the chopsticks being centrally aligned in the track while they pass one or more processing implements. The centering is ensured by means of identical centering rolls operating from their respective side of the plane of symmetry of the chopsticks. The centering rolls are biased by a spring tension. The processing implements for processing the edges of the articles along the oblique surfaces are associated with centering rolls, and accordingly they follow the movement of these centering rolls along the oblique surfaces of the articles in a direction away from their plane of symmetry during the passage of the articles.

SUMMARY OF THE INVENTION

The method according to the invention is characterized in that, during the advancing movement, one oblique surface of the articles, the common longitudinal plane of symmetry, and the second oblique surface are aligned one by one substantially parallel to a common plane of alignment extending in the direction of advance and are processed by a pair of processing implements associated with each aligning position, the advance being carried out by means of continuously rotating friction rolls engaging the mutually parallel surfaces of the articles.

The resulting method allows quick, uniform, and efficient processing of succeeding articles, which is especially due to the fact that the implements need to operate only on edges parallel to the common plane of alignment during the processing. Accordingly, the axes of the processing implements need not move more than necessary to take into account dimensional differences of the individual articles. Thus, the processing implements can relatively quickly and easily enter a correct starting position for receiving a new article, with the result that the articles can be high-quality processed and be advanced at a relatively high speed, so that approximately 30,000 articles can be processed per hour.

The apparatus for carrying out the method comprises conveyor means advancing the articles in a longitudinal direction, as well as processing implements processing the articles while they pass through the apparatus. The apparatus comprises a number of activatable friction rolls adapted to engage the parallel surfaces of the articles and to advance the articles during passage of the processing implements. The apparatus comprises two guides interspaced when seen relative to the direction of advance, and being associated with their respective set of processing implements and comprising opposing plane guide surfaces which are parallel to a common plane of alignment extending in the direction of advance and substantially perpendicular to the axes of rotation of the friction rolls, where the guide surfaces successively engage the oblique surface of the advanced articles, the articles being pressed against said guide surfaces by means of resilient pressing means. Identical centering rolls are provided between the guides and operate from their respective side towards the common plane of alignment, the centering rolls being biased by uniform spring tension and engaging the respective oblique surfaces of the articles so as to align the plane of symmetry of the articles parallel to the plane of alignment while the articles are subjected to processing by means of a pair of processing implements.

The resulting apparatus has a simple structure and allows a uniform processing of the individual articles. The use of friction rolls allows for a flexible advance because it permits the articles to slide a short distance relative to the friction rolls in case the articles must be stopped during their advancing movement. In this manner the processing implements can relatively reliably ensure the necessary processing with a good result independent of variations in the wooden material of the articles. All the friction rolls cooperate only with the plane sides of the articles, and all the implements process portions aligned in the direction of advance with the result that neither the friction rolls nor the processing implements are subjected to a displacement beyond the one caused by dimensional differences of the individual articles. As a result, each roll and each implement can always be quickly and easily returned to the starting position in which they receive a new article.

Most of the activatable friction rolls may be arranged in pairs opposite one another on their respective side of the advancing track of the articles, and the friction rolls on one side of the advancing track may define a common advancing plane perpendicular to the plane of alignment, whereas the friction rolls on the opposite side of the advancing track are resiliently biased by spring tension towards the advancing plane, whereby a particularly simple structure is obtained.

Each processing implement may comprise an activatable, rotating milling cutter with an axis of rotation extending substantially parallel to the axes of rotation of the friction rolls, and a friction roll may be pivotally arranged on the shaft of each milling cutter, the friction roll also engaging the articles and being caused to follow the rotation by means of the adjacent previous friction roll through a belt drive when seen in the moving direction of the articles. In this manner, the movement of each processing implement relative to the advancing plane is controlled by a friction roll and accordingly in direct response to the thickness of the articles measured towards the plane of symmetry. The belt drive connection between the friction roll associated with each milling cutter and the immediately preceding friction roll ensures that the articles are subjected to the same rotational speed.

The friction roll, which is resiliently arranged immediately upstream of a pair of milling cutters and which causes the friction roll associated with one milling cutter to follow the rotation, may be secured on a shaft, where the shaft in turn is rotatably arranged in a supporting block displaceably arranged parallel to the plane of alignment. The supporting block also includes the shaft of the milling cutter, and the supporting block may be biased towards the advancing track of the articles. In this manner, the milling cutters are automatically correctly positioned relative to the articles because the preceding friction roll ensures the necessary displacement of the supporting block and consequently of the milling cutter.

Adjustable stopping means may be provided for the adjustment of a predetermined minimum distance between the two milling cutters of the same pair of cutters, so that two opposing milling cutters are not moved towards one another more than necessary for processing the article of the minimum possible thickness.

The friction rolls resiliently arranged outside the supporting blocks on one side of the advancing track may be secured on drive shafts associated with adjusting means for adjustment of the angle of inclination of the drive shafts relative to the drive shafts of the friction rolls on the opposite side of the advancing track of the articles. In this manner it is possible to adjust the friction rolls so as to assist the pressing means in pressing the articles against the guides.

The invention further relates to an apparatus, where the articles are advanced to the starting position for movement along the advancing track of the apparatus by means of continuous conveyor means, which parallelly displace the articles into a starting position in alignment with the advancing track. In this apparatus, the invention characterised in that a plurality of activatable friction rolls is provided above the conveyor means immediately adjacent the starting position of the articles, and that a transferring means is provided below the friction rolls, said transferring means causing the articles to disengage the conveyor means and engage the activatable friction rolls, the transfer means abutting the articles by means of a number of loosely arranged resilient rolls.

In this manner the friction rolls ensure easy and simple transfer of the articles from the conveyor means to the further line of advance.

The transfer means may be displaceably arranged on guides and be synchronously activated relative to the conveyor means by means of a connecting rod mechanism, and the connecting rod of the connecting rod mechanism may comprise a cylinder-piston device for controlled regulation of the stroke of the transfer means in response to a sensor registering whether the article in the starting position has been correctly positioned for advancement by the friction rolls. In this manner, it is ensured in a simple manner that incorrectly positioned articles, i.e., articles resting on one of the oblique surfaces atop the conveyor means, are not advanced for further processing, but remain on the conveyor means so as to be discarded therefrom. The latter procedure is ensured by the stroke of the connecting rod mechanism being reduced when the sensor registers an incorrectly positioned article. Under normal conditions, the connecting rod mechanism carries the transfer means with the resiliently arranged rolls upwards into engagement with each article and causes the article to disengage the conveyor means and engage the opposing activatable friction rolls. The resilience of the transfer means ensures that the rolls remain in engagement with the articles for a relatively long period of time, even though the connecting rod mechanism retracts the transfer means immediately upon reaching its top position. In this manner, it is ensured that the activated friction rolls have sufficient time for advancing the articles in the advancing track to succeeding friction rolls for further advancement before the transfer means release the articles.

BRIEF DESCRIPTION OF THE DRAWINGS

The invention is described in greater detail below with reference to the accompanying drawing, in which.

DESCRIPTION OF THE PREFERRED EMBODIMENTS

Figure 1A:
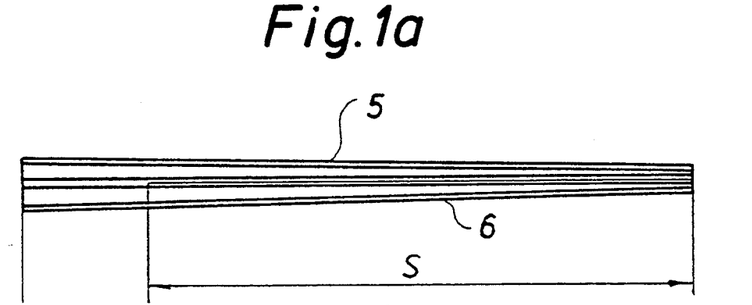
FIGS. 1a, 1b and 1c are top, side, and end views, respectively, of a set of completed coherent chopsticks, the end view being seen from the thickest end.
Figure 1B:
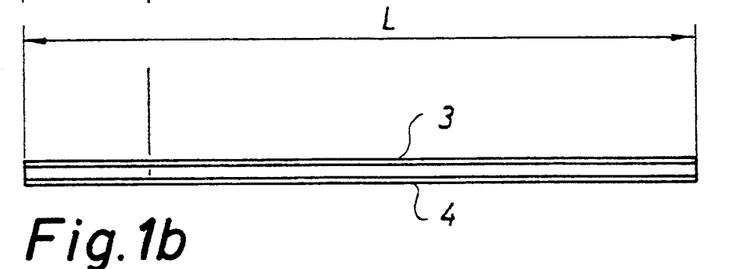
Figure 1C:
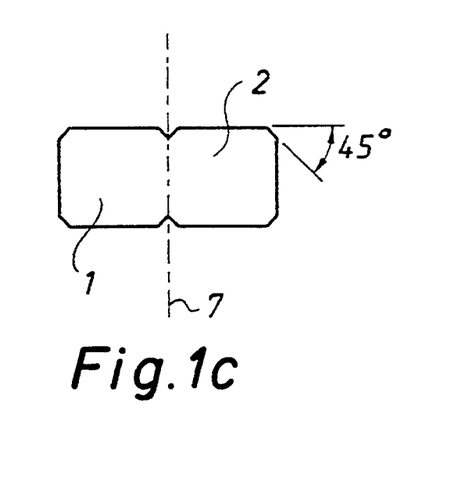

The set of chopsticks shown in FIGS. 1a, 1b and 1c comprises two coherent chopsticks 1 and 2 manufactured in advance and cut out of suitable wooden material. The chopsticks are defined by two parallel surfaces 3, 4 as well as by two oblique surfaces 5, 6 inclining towards one another by the same inclination relative to a centrally situated plane of symmetry. The plane of symmetry is indicated by dotted lines 7 in FIG. 1c and extends in the longitudinal direction of the chopsticks. The sticks are cut through over a length S in the plane of symmetry, length S corresponding to a substantial portion of the total length L of the sticks. By the method and the apparatus described below, the chopsticks are subjected to a processing whereby all the longitudinal edges are provided with bevelling. When the sticks are to be used, they are easily taken apart.

Figure 2:
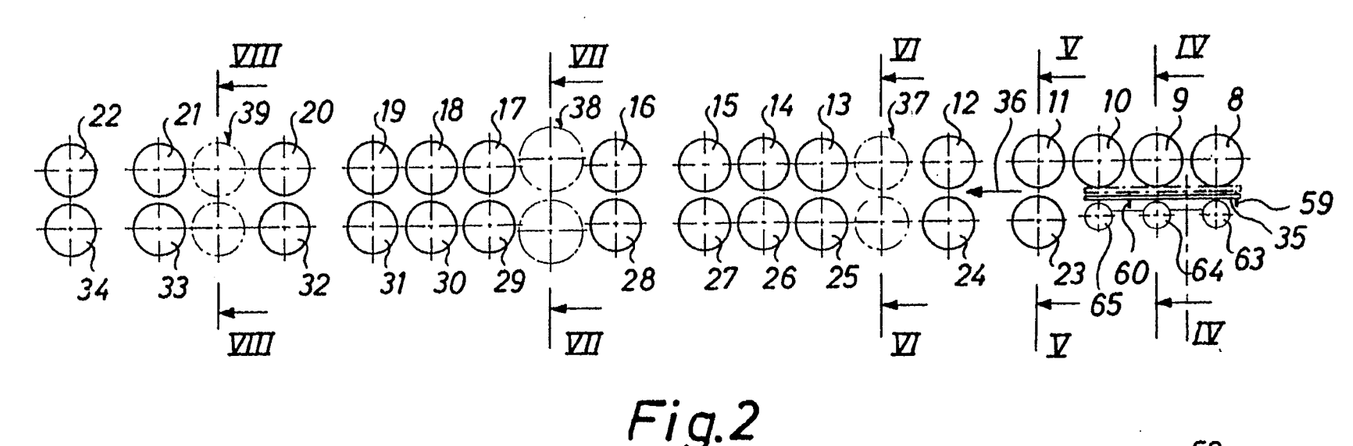
FIG. 2 is a schematic side view of an apparatus according to the invention, illustrating the various sections which the coherent chopsticks pass according to the method of the invention.
Figure 3:
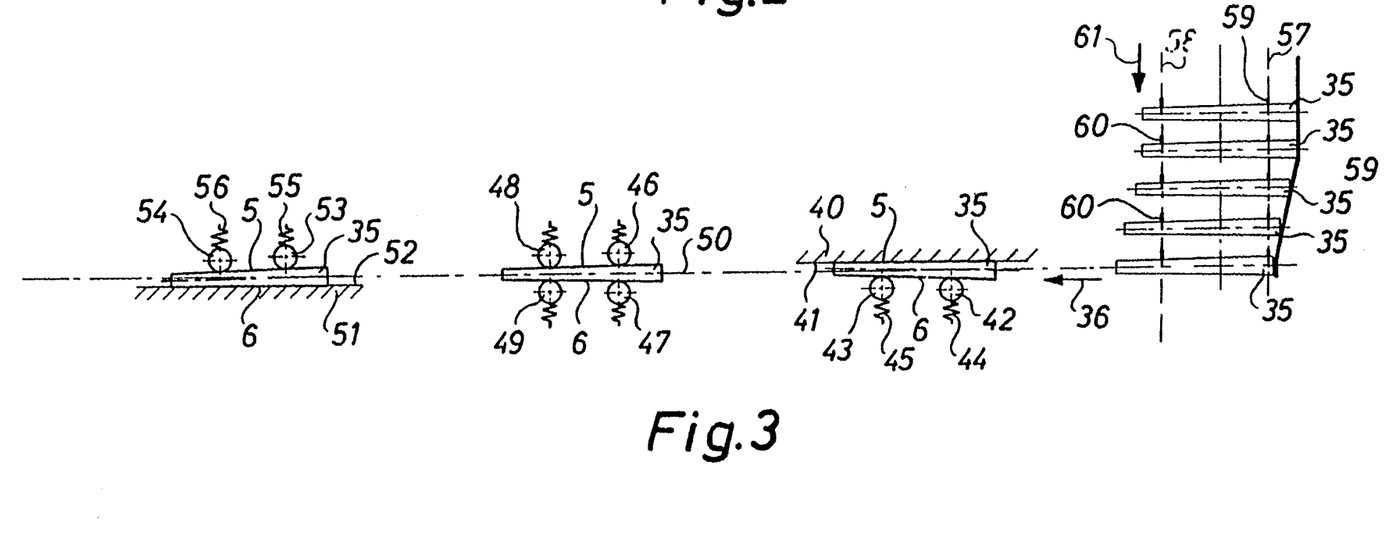
FIG. 3 is a top view of the apparatus of FIG. 2.

The apparatus of FIGS. 2 and 3 comprises a plurality of conveyor means, including upper, activated friction rolls 8 to 22, and lower, activated friction rolls 23 to 34. The upper friction rolls are caused to rotate clockwise, whereas the lower friction rolls are caused to rotate counter-clockwise with the result that the articles 35 are advanced from the right to the left in FIGS. 2 and 3 in the direction of advance indicated by arrow 36, each article 35 comprising two coherent chopsticks 1 and 2. The articles 35 are advanced one by one past a first, a second, and a third pair of processing implements 37, 38, and 39 and indicated in chain dotted lines in FIG. 2.

While passing the first pair 37 of processing implements, one oblique surface 5 of each article 35 is pressed against the first guide 40 comprising a plane, vertical guide surface extending parallel to the advancing direction 36 of the article 35. The pressing is carried out by means of pivotally arranged pressing rolls 42, 43 schematically shown in FIG. 3. The pressing rolls 42, 43 are pressed against the article 35 by means of their respective spring 44, 45. While passing the second pair 38 of processing implements, the plane of symmetry 7 of each article 35 has been aligned with the direction of advance by means of identical centering rolls 46, 47 and 48, 49, respectively, operating from their respective side. The centering rolls are schematically shown in FIG. 3 and are biased by the same spring tension towards the vertical plane of alignment 50, in which the plane of symmetry 7 is to be situated. The centering rolls are interconnected in pairs in a manner not described in greater detail and with the effect that they are always positioned in pairs at the same distance from the plane of alignment 50. The latter distance can, for instance, be ensured by interconnecting the axes of rotation of the centering rolls in pairs by way of their respective gear wheel.

While passing the third set of processing implements, the second oblique surface 6 of the article 35 is pressed against a second guide 51 also comprising a vertical guide surface 52 parallel to the direction of advance 36. The article 35 abuts the latter vertical guide surface 52. The article 35 is pressed against the guide 51 by means of pivotally arranged pressing rolls 53, 54 schematically shown in FIG. 3 and being pressed against the article 35 by means of their respective spring 55 and 56.

Figure 4:
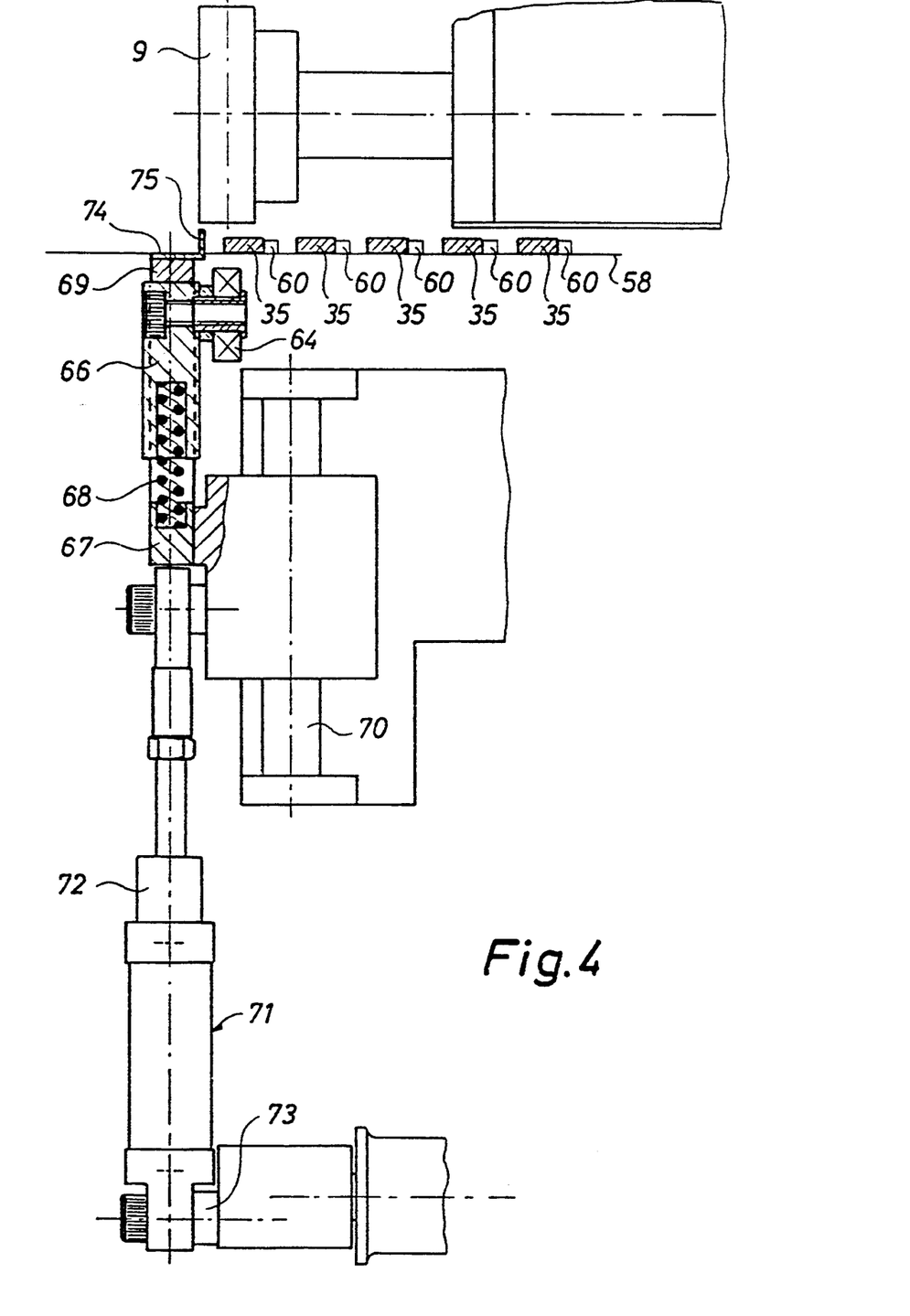
FIG. 4 is a sectional view taken along line IV—IV of FIG. 2, parts having been omitted for the sake of clarity, and comprises a schematic view of conveyor means advancing the coherent chopsticks to processing by means of the apparatus according to the invention.

As indicated in FIGS. 2 and 3, and as indicated in greater detail in FIG. 4, the article 35 is advanced so as to be positioned opposite the three activated, upper friction rolls 8, 9, and 10 situated farthest to the right in FIG. 2. The article 35 is advanced by a pair of transverse, endless conveyor means 57, 58 comprising dogs 59 and 60, respectively. The dogs 59 and 60 are adapted to abut the oblique surfaces of the article 35 so as thereby to advance the articles in the direction indicated by arrow 61 to the position immediately below the three first friction rolls 8, 9, and 10. During the latter advancing movement, the broadest end of the articles 35 is caused to abut a guide 62 in such a manner that the articles enter the desired position relative to the friction rolls 8 to 10 when seen in the longitudinal direction.

Three loosely arranged transfer rolls 63, 64, and 65 are provided immediately below the three first friction rolls 8, 9, and 10 and the transverse conveyor means 57, 58, which are only schematically shown in FIGS. 3 and 4. The axes of rotation of the three transfer rolls 63, 64, and 65 extend parallel to the friction rolls 8, 9, and 10. The transfer rolls, only one of which (64) is visible in FIG. 4, are pivotally secured on their respective supporting block 66. Each supporting block is vertically displaceably arranged on a support 67, each supporting block being pressed by its respective spring 68 from below against a horizontal stop rail 69 secured on the support 67. The support 67 is vertically displaceably connected to a guide column 70 and is caused to reciprocate vertically thereon by means of a connecting rod mechanism 71. The connecting rod mechanism comprises a connecting rod 72 and a motor-driven eccentric 73. The connecting rod 72 is a cylinder-piston device, the total length of which is controlled by a sensor (not shown) which registers whether the articles 35 on the transverse conveyor means are correctly positioned.

At the top, the support 67 carries L-shaped stop means 74 with legs 75 projecting vertically upwards. The support 67 and the stop rail 69 and the L-shaped stop means are provided with recesses (not shown). The recesses allow up and downward displacement of the support without the support interfering with the transverse conveyor means and the opposing first friction rolls 8, 9, and 10.

The support reciprocates a vertical direction synchronously with the advancing speed of the articles 35. In this manner, the stop means 74 of the support 67 during the upward movement of said support 67, are moved into position in front of each article, whereby the article is retained until the transfer means 62, 63, and 64 immediately therafter abuts the article 35 in question from the bottom and transfers it into abutment against the friction rolls 8, 9, and 10. As soon as the article 35 has been pressed against the friction rolls 8, 9, and 10, it is advanced in the direction indicated by the arrow 36. The displaceable arrangement of the supporting rolls 63, 64, and 65 on the support 67 is such that the supporting rolls remain in engagement with the articles for a period of time after the support has started to move downwards again, driven by the connecting rod mechanism. In this manner, it is ensured that the article 35 is retained in engagement with the first friction rolls until it has engaged the succeeding lower friction rolls. The stop means 64 of the support 67 ensure that the articles are correctly positioned relative to the first friction rolls 8, 9, and 10 and relative to the supporting rolls 63, 64 and 65 loosely arranged therebelow, although the articles do not directly abut succeeding dogs 59, 60, but are positioned a short distance in front thereof.

When the sensor (not shown) registers that one of the articles 35 is incorrectly positioned on the supporting means, the piston-cylinder device of the connecting rod is activated such that the stroke of the connecting rod 72 is reduced. As a result, the support 67 is prevented from engaging the article 35 in question. Subsequently, the article 35 in question is carried away past the support 67 so as subsequently to be correctly positioned, if desired, on the conveyor means. When the article in question has passed the support 67, the stroke of the connecting rod is reextended to usual length.

Figure 5:
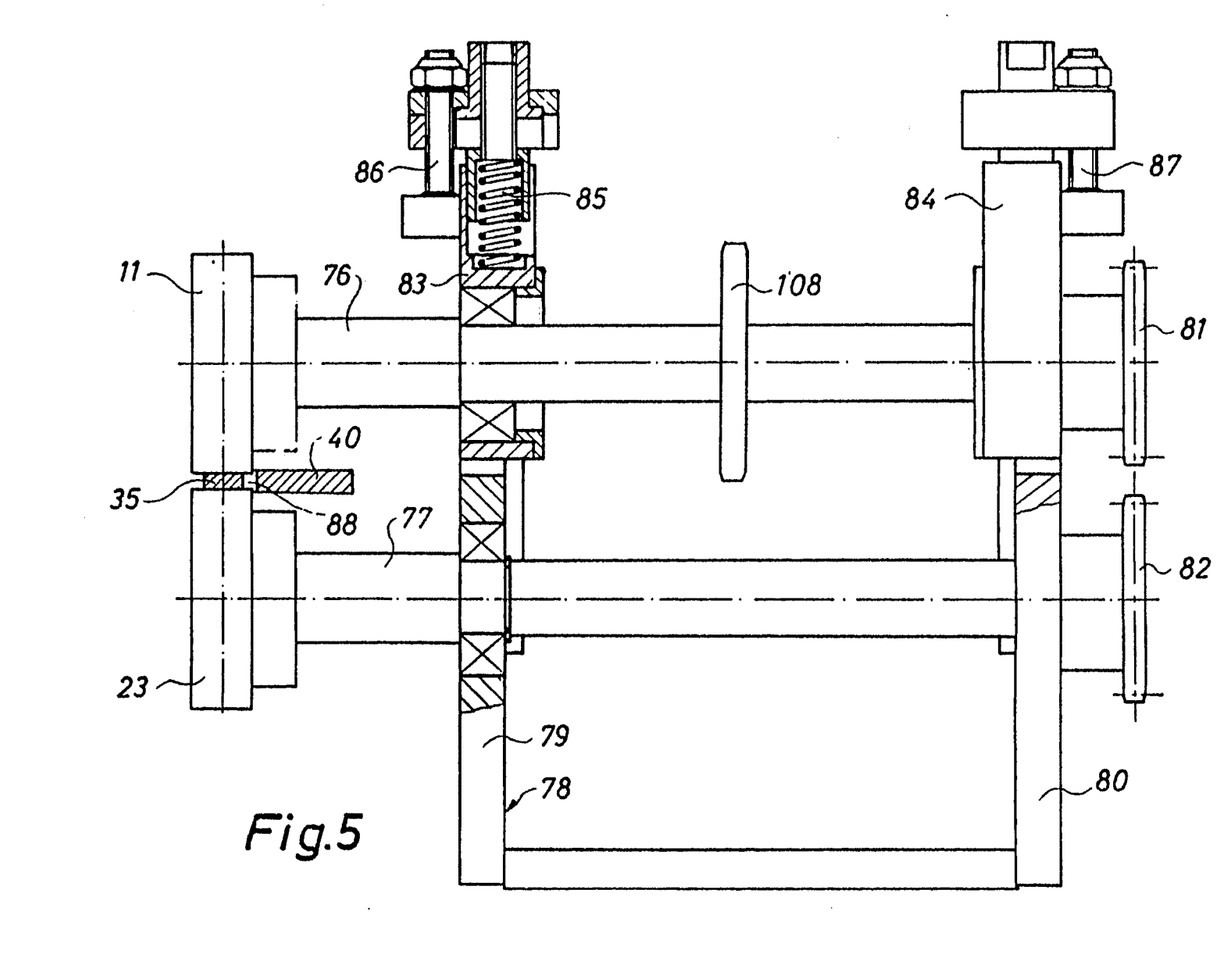
FIG. 5 is a sectional view taken along line V—V of FIG. 2 and showing friction rolls advancing the coherent chopsticks.

As illustrated in FIG. 5, both the upper and the lower friction rolls are mounted on their respective shaft 76, 77 rotatably arranged in the frame 78 of the apparatus, which comprises a front vertical wall 79 and a rear vertical wall 80. Each shaft 76, 77 carries a sprocket 81 and 82, respectively, behind the rear wall 80. The sprockets engage a chain (not shown), which ensures that all the friction rolls follow the rotation at the same rotational speed, the upper friction rolls 8 to 22 rotating clockwise, while the lower friction rolls 23 to 34 rotate counter-clockwise.

The shafts 76 of the upper friction rolls 8 to 22 are connected to the frame 78 by means of supporting blocks 83 and 84, which are vertically displaceable and pressed downwards by means of their respective spring 85. Each supporting block 83 and 84 is connected to the associated wall of the frame 79 and 80, respectively, by means of an adjusting screw 86 and 87, respectively. The adjusting screws render it possible to adjust the minimum distance between two opposing friction rolls simultaneously with the shafts 76 of the upper friction rolls 8 to 22 being positioned with a desired inclination in vertical direction so as to ensure that the advanced articles 35 do not slide out of engagement with the friction rolls in one direction transverse to the direction of advance away from the guides 40 and 51.

As shown in FIG. 5, recesses 88 provided in the guide 40 ensure that the guide does not interfere with the friction rolls. Corresponding recesses are provided in the guide 51.

Figure 6:
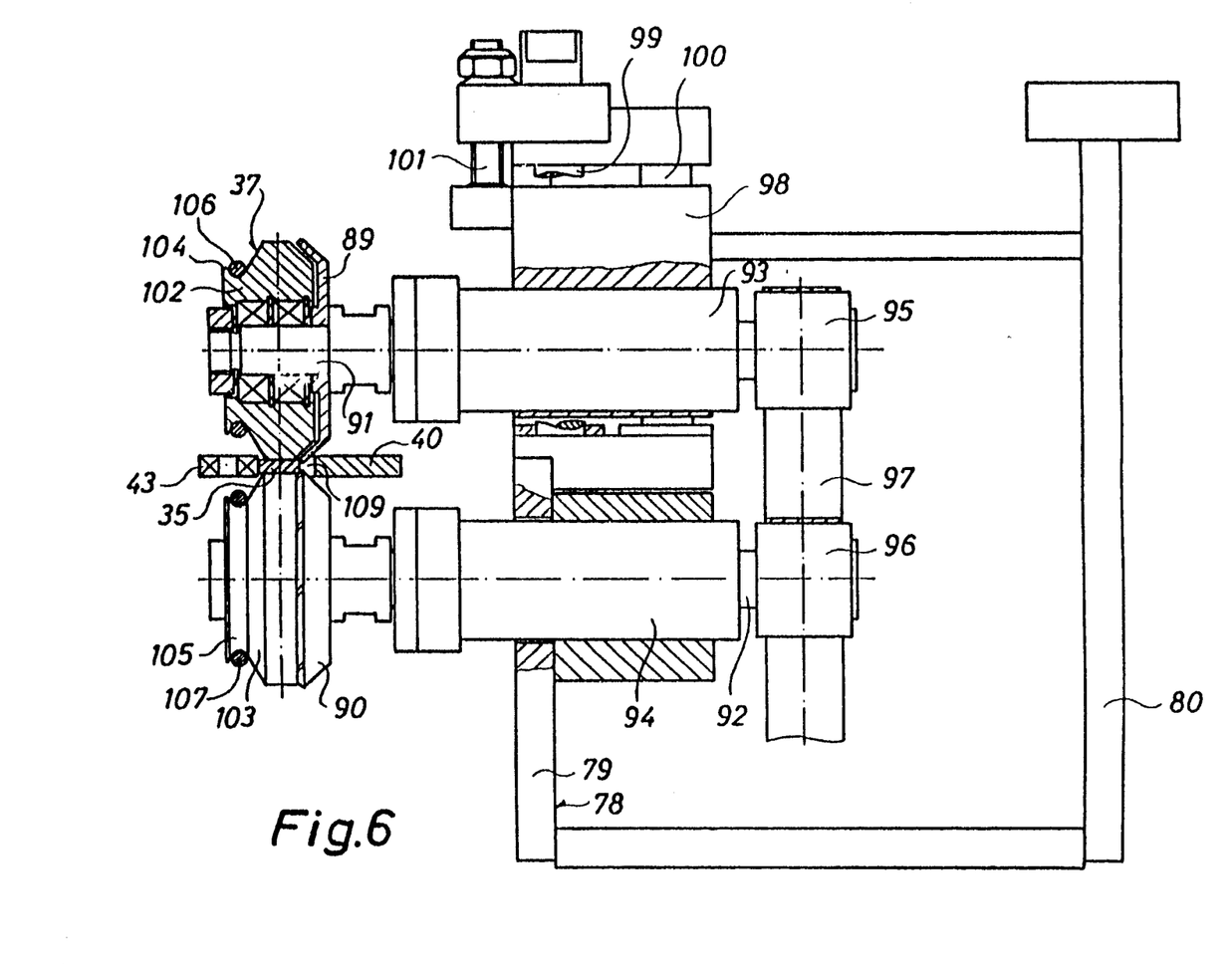
FIG. 6 is a sectional view taken along line VI—VI of FIG. 2 and shows a first set of processing implements.

As shown in FIG. 6 first pair of processing implements 37 comprises two milling cutters 89, 90 situated vertically above one another. The milling cutters are adapted to be rotated in opposite directions so as to bevel the edges of the oblique surface of the article 35 abutting the guide 40 while the edges are being pressed against the guide by means of the pressing rolls 42 and 43. The milling cutters 89 and 90 are secured on their respective shaft 91 and 92, respectively, which are rotatably arranged in their respective housing 93 and 94, respectively. At the opposite end, the shafts are provided with pulleys 95 and 96, respectively, behind the front wall 79 of the frame. These pulleys are rotated by means of a common belt drive 97 in such a manner that the two milling cutters 89 and 90 are driven at the same rotational speed, but in opposite directions, so that the upper milling cutter 89 rotates counter-clockwise and the lower cutter rotates clockwise.

The housing 94 of the lower milling cutter 90 is secured to the front wall of the frame 78, whereas the housing 93 of the upper milling cutter 89 is secured to a supporting block 98 vertically displaceable in the front wall 79 of the frame 78. The supporting block 98 is displaceably arranged on two vertical guide columns 99 and 100 fixed in the frame. An adjusting screw 101 is mounted between the supporting block 98 and the front wall 79 of the frame, the adjusting screw allowing presetting of the minimum distance between the upper and lower milling cutters 89 and 90. A spring (not shown) provided between the supporting block 98 and the front wall 79 of the frame, biases the supporting block 98 downwards towards the housing 94 of the lower milling cutter 90. A friction roll 102 and 103, respectively, is provided upstream of the two milling cutters 89 and 90 on the associated shafts 91 and 92. The friction rolls 102 and 103 are able to rotate freely on the associated shaft. Each friction roll 102 and 103 is integral with a pulley 104 and 105, respectively. Each pulley is connected by a belt 106 and 107, respectively, to a pulley shaped on the immediately preceding friction roll 12 and 24, respectively. The resulting freely rotating friction rolls 102 and 103 can be driven at the same speed and in the same direction as the immediately preceding friction rolls 12 and 24.

The upper friction roll 12, which is arranged immediately upstream of the upper milling cutter 89 and which causes the associated loose friction roll 102 to follow its rotation, comprises a shaft rotatably arranged in the same supporting block 98 as the one supporting the milling cutter 89. When the upper friction roll adjusts itself relative to a newly advanced article 35 by a vertical displacement, the milling cutter 89 is automatically positioned correctly relative to the article 35 immediately before it starts the processing thereof. Unlike the remaining upper friction rolls, the shaft on the upper friction roll 12 does not therefore extend through the rear wall 80 of the frame 78, but ends instead between the walls, where it carries a sprocket which, through a separate chain, is caused to rotate by a sprocket 108 on the shaft 76 of the friction roll 11 in front thereof. In this manner, the upper friction roll 12 positioned upstream of the upper milling cutter 89 is driven at the same rotational speed as the remaining friction rolls.

Opposite the first pair of processing implements 37 and opposite the pairs of friction rolls, the guide 40 is provided with a recess 109 or a short gap so as to allow the milling cutters 89 and 90 to operate freely at the same time as the articles 35 are pressed against the guide surface 41 of the guide both in front of and behind the milling cutters when seen in the advancing direction.

Figure 7:
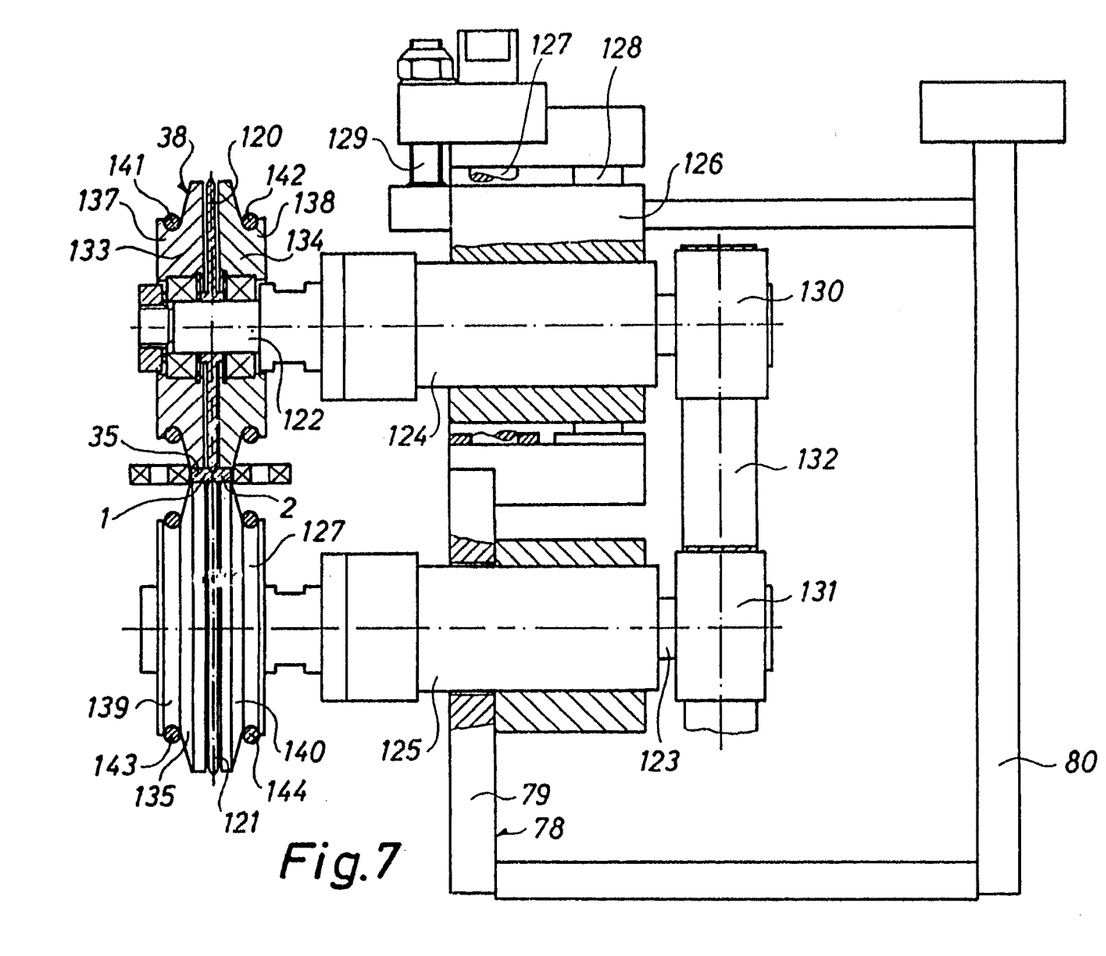
FIG. 7 is a schematic sectional view taken substantially along line VII—VII of FIG. 2, and shows a second set of processing implements.

The second pair of processing implements 38 also comprises an upper milling cutter 120 and a lower milling cutter 121. These milling cutters 120 and 121 are suitably shaped to bevel the abutting edges along the plane of symmetry 7 on the coherent chopsticks 1, 2, and correspond completely to the milling cutters 189 and 190 in the first pair of processing implements 37, the milling cutters 120 and 121 being secured to their respective shaft 122 and 123, respectively, mounted in their respective housing 124 and 125, respectively. Like the housing 93 of the upper milling cutter 89 in the first pair of processing implements 37, the housing 124 is secured in a displaceably arranged supporting block 126. The supporting block 126 is adapted to reciprocate in vertical direction along two guide columns 127 and 128 and is biased by means of a spring (not shown) in a downward direction towards the housing 125 therebelow. The housing 125 is secured to the front wall 79 of the frame 78. Furthermore, an adjusting screw 129 is provided, which allows desired presetting of the minimum distance between the two milling cutters 120 and 121.

The milling cutters 120 and 121 are rotated by means of pulleys 130 and 131 caused to rotate by a motor (not shown) via a belt drive 132. Like the preceding milling cutters 89 and 90, the milling cutters 120 and 121 also rotate in a direction that the articles 35 are subjected to a milling in direction much opposite their direction of advance.

Loosely arranged friction rolls 133, 134 and 135, 136, respectively, are provided on each side of the milling cutters 120 and 121. These friction rolls are all integral with pulleys 137, 138 and 139, 140, respectively. By means of associated belts 141, 142, 143 and 144, respectively, the pulleys allow the friction rolls to be driven at exactly the same rotational speed as the immediately preceding friction rolls 16 and 28, the belts being connected to similar pulleys (not shown), but provided on said immediately preceding friction rolls 16, 28. In the latter case, too, the shaft of the preceding upper friction roll 16 is rotatably arranged in the same supporting block 126 as the housing 124 of the upper milling cutter 120 in such a manner that when the upper preceding friction roll 16 adjusts itself relative to a new article 36, the upper milling cutter 120 also adjusts itself automatically due to the displacement of the supporting block 126.

Figure 8:
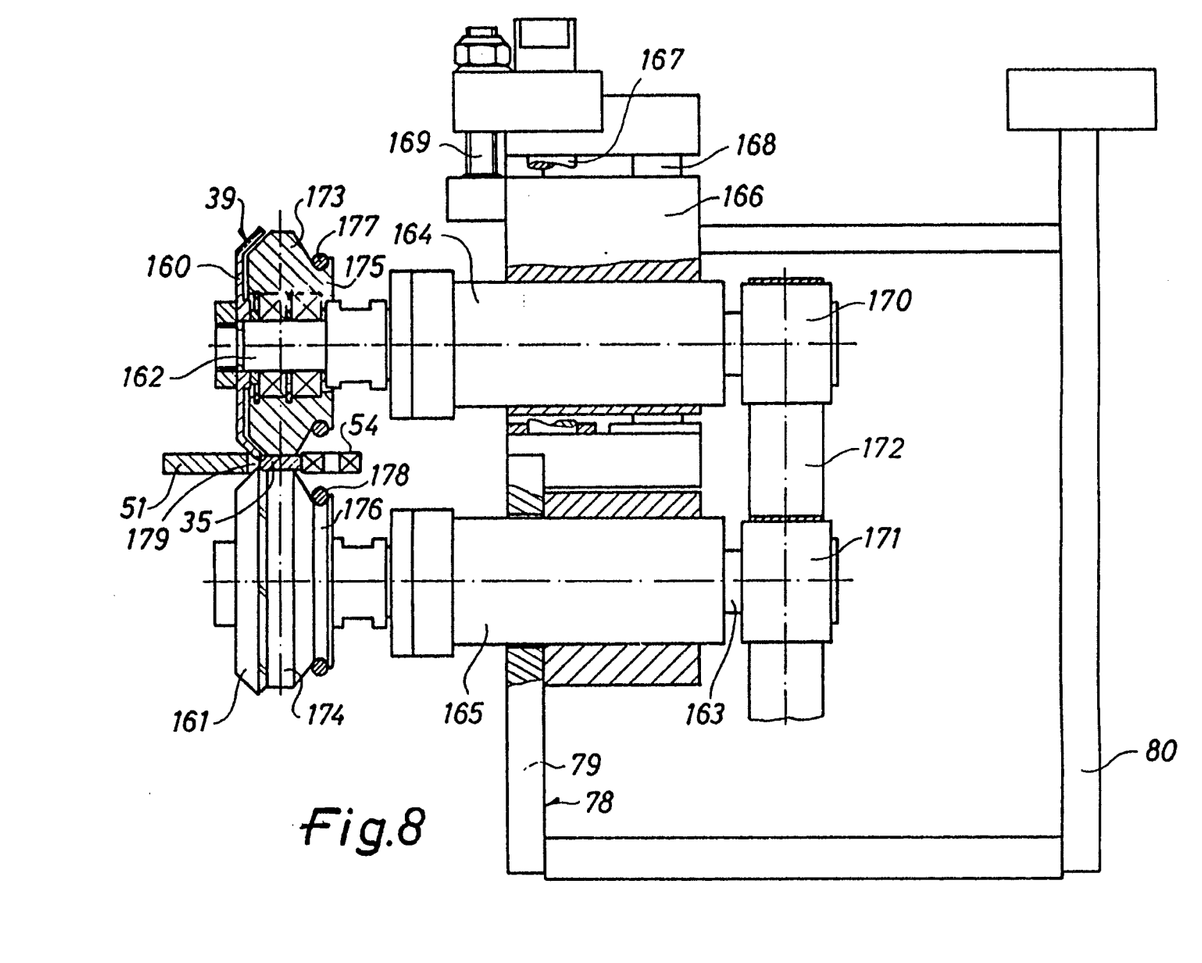
FIG. 8 is a schematic sectional view taken substantially along line VIII—VIII of FIG. 2, and shows a third set of processing implements.

As illustrated in FIG. 8, the third pair of processing implements 39 corresponds completely to the first pair of processing implements, apart from the fact that said third pair of processing implements is adapted to bevel the edges along the second oblique surface of the articles 35. The third pair of processing implements therefore also comprises therefore also an upper milling cutter 160 and a lower milling cutter 161 secured on their respective shaft 162 and 163, respectively, which is rotatably arranged in their respective housing 164 and 165, respectively. The housing 164 is secured in a vertically displaceable supporting block 166 displaceably arranged on guide columns 167 and 168 and biased in a downward direction towards the lower housing 165. The lower housing 165 is secured in the front wall 79 of the frame 78, the minimum distance therebetween being preset by means of an adjusting screw 169. Pulleys 170 and 171, respectively, are also secured at the ends of the shafts 162 and 163 opposite the milling cutters 160, 161, the pulleys being caused to rotate through a belt drive 172 by means of a motor (not shown) in such a manner that the milling cutters 160 and 162 rotate in the same direction as the milling cutters of the other two pairs of processing implements.

Loosely and rotatably arranged friction rolls 173 and 174, respectively, are also provided in connection with the upper milling cutter 160 and the lower milling cutter 161. These friction rolls are integral with their respective pulley 175 and 176, whereby they can be caused to rotate through belts 177 and 178, respectively, by means of their respective friction roll of the preceding friction rolls 20 and 32, respectively, at the same rotational speed as the latter rolls. The upper friction roll 20 is also mounted on a shaft (not shown), which in turn is secured in the same supporting block 166 as the housing 164 of the upper milling cutter 160. As a result, the correct positioning of the latter milling cutter relative to the advancing articles is set through the upper friction roll 20 situated in front thereof. The latter friction roll 20 is also caused to rotate by means of a sprocket and a chain (not shown), but connected to the shaft of the friction roll 19 in front thereof, i.e., exactly as described in connection with the first pair of processing implements.

As explained, the second oblique surface of the articles 35 is advanced towards a guide 51 on the side facing outwards of the third pair of processing implements 39, while the oblique surface is being pressed against the guide by means of the pressing rolls 53 and 54. In this case too, the guide is provided with a recess 179 so as to accommodate the milling cutters 160 and 161.

When the apparatus according to the invention is used, the articles are advanced to the advancing track 36 of the apparatus for processing by means of the transverse conveyor means. From the latter, the articles are transferred for further transport by the upper and lower friction rolls 8 to 34. The transfer is carried out by means of the transfer rolls 63, 64, and 65, the support 67 of which reciprocates vertically by means of the connecting rod mechanism 71. The stroke of the connecting rod 72 of the connecting rod mechanism 71 is adjusted in response to whether the articles 35 are correctly positioned on the transverse conveyor means 57, 58. When an article is incorrectly positioned, i.e. rests on one of its oblique surfaces 5, 6, the stroke of the connecting rod 72 is reduced in such a manner that the transfer rolls 63, 64, and 65 of the support 67 are prevented from engaging the article 35. As a result, the article 35 in question is discarded by means of the transverse conveyor means 57, 58 without being processed.

While being advanced by means of the friction rolls 8 to 34, one oblique surface 5 of the articles 35 is intially carried towards the guide surface 41 of the first guide 40 by means of the pressing rolls 42 and 43. Subsequently, during the further advance, the article is carried by means of the friction rolls past the first pair of processing implements bevelling the edges abutting the guide 40. The mutual distance between the milling cutters 89, 90 of the first pair of processing implements is preset by means of the immediately preceding pair of friction rolls 12, 24 in response to each article 35 before that article reaches the cutters, the distance between the two rolls being determined by the displacement of the upper friction roll 12 together with the resiliently arranged, vertically displaceable supporting block 98, which also carries the succeeding milling cutter 89. The necessary setting of the milling cutters 89 and 90 relative to one another is only adjusted in response to variations in the thickness of the article 35. Accordingly, the necessary movement of the upper milling cutter 89 relative to the lower milling cutter 90 is relatively short, because the necessary minimum distance between the milling cutters 89 and 90 can be preset by means of the adjusting screw 101. Therefore, the milling cutters 89 and 90 are always correctly positioned before a new article 35 is advanced thereto, with the effect that the resulting bevelling of the milling cutters 89 and 90 on the article 35 has a good and uniform appearance.

Having passed the first pair of processing implements 37, the plane of symmetry of the article 35 is aligned with the direction of advance 36 by means of the centering rolls 46, 47 and 48, 49, whereafter the articles is advanced by means of the friction rolls past the second pair of processing implements 38 bevelling the edges adjacent the plane of symmetry 7 of the coherent pairs of chopsticks. In this case, too, the milling cutters 120 and 121 of the second pair of processing implements 38 are mutually adjusted before the individual articles 35 are advanced; this is carried out in exactly the same manner as described in connection with the first pair of processing implements.

Having passed the second pair of processing implements, the second oblique surface 6 of the articles is pressed against the guide surface 52 of the second guide 51 by means of the pressing rolls 53, 54. During the further advance by means of the friction rolls, the articles 35 are advanced past the third pair of processing implements 39, the milling cutters 160 and 161 of which ensure the bevelling of the edges of the articles abutting the guide 51. The correct mutual positioning of the two milling cutters 60 and 61 is carried out in exactly the same manner as described in connection with the two preceding pairs of processing implements 37 and 38.

The completely processed article is carried out of the apparatus for further handling, such as packing.

All the friction rolls 8 to 23 as well as the friction rolls 102, 103, 133, 134, 135, 136, and 173, 174 associated with the processing implements are caused to rotate at the same rotational speed by means of a belt drive on the rear side of the apparatus. The belt drive is activated by means of a suitable motor. The milling cutters are rotated by means of separate motors through belt drives 97, 132, and 172 independent of the rotation of the friction rolls. The friction rolls are made of a suitable material ensuring that the articles 35 are advanced by way of friction allowing a sliding movement of the rolls relative to said articles 35, especially when the articles pass the processing implements.

I claim:

1. A method of continuously processing elongated articles having an outer shape defined by two mutually parallel surfaces and two opposing, plane, oblique surfaces inclining towards one another by the same inclination relative to a common plane of symmetry, said method comprising the steps of
   (a) advancing said articles in a longitudinal direction while passing pairs of processing implements;

(b) during the advancing movement aligning one oblique surface of said articles, a common longitudinal plane of symmetry, and a second oblique surface one by one substantially parallel to a common plane of alignment extending in a direction of advance and processing said articles by a pair of processing implements associated with each of several alignment positions, said advancing being carried out by bringing continuously rotating friction rolls into engagement with said mutually parallel surfaces of said articles.

2. An apparatus for continuously processing elongated articles, comprising
   (a) conveyor means advancing the articles in a longitudinal direction;
   (b) a plurality of sets of processing implements processing the articles while they pass through said apparatus;
   (c) a plurality of activatable friction rolls adapted to engage parallel surfaces of said articles and to advance said articles during passage of said processing implements;
   (d) two guides staggered from one another in a direction of advance of said articles, said guides being associated with respective sets of said processing implements and comprising opposing plane guide surfaces parallel to a common plane of alignment extending in said direction of advance and substantially perpendicular to axes of rotation of said friction rolls, said guide surfaces being adapted to successively engage an oblique surface of said articles;
   (e) resilient pressing means for pressing said articles against said guide surfaces; and
   (f) identical centering rolls between said guides and operating from respective sides towards said common plane of alignment, said centering rolls being biased by uniform spring tension and engaging said respective oblique surfaces of said articles so as to align said plane of symmetry of said articles parallel to said plane of alignment while said articles are subjected to processing by means of a pair of said processing implements.

3. An apparatus as claimed in claim 2, wherein said activatable friction rolls are arranged in pairs opposite one another on a respective side of an advancing track of said articles, friction rolls on one side of said advancing track defining a common advancing plane perpendicular to said plane of alignment, while friction rolls on an opposite side of said advancing track are resiliently biased by spring tension towards said advancing plane.

4. An apparatus as claimed in claim 2 or 3, wherein each processing implement comprises an activatable, rotating milling cutter with an axis of rotation extending substantially parallel to axes of rotation of said friction rolls, a friction roll being pivotally arranged on the shaft of each milling cutter, said friction roll also engaging said articles and being caused to follow the rotation by means of the adjacent previous friction roll through a belt drive when seen in a direction of movement of said articles.

5. An apparatus as claimed in claim 4, wherein a said friction roll which is resiliently disposed immediately upstream of a pair of milling cutters and causes said friction roll associated with one milling cutter to follow the rotation, is secured on a shaft rotatably arranged in a supporting block displaceably arranged parallel to said plane of alignment, said supporting block also including a shaft of said milling cutter and said supporting block being biased towards said advancing track of said articles.

6. An apparatus as claimed in claim 5, comprising adjustable stop means for adjustment of a predetermined minimum distance between two milling cutters of a same pair.

7. An apparatus as claimed in claim 5, wherein said supporting friction rolls resiliently arranged outside said supporting blocks on one side of said advancing track are secured on drive shafts associated with adjusting means for adjustment of an angle of inclination of said drive shafts relative to said drive shafts of said friction rolls on the opposite side of said advancing track of said articles.

8. An apparatus as claimed in any one of claims 1 to 3, comprising continuous conveyor means for advancing said articles to a starting position for movement along said advancing track, said continuous conveyor means parallelly displacing said articles into said starting position in alignment with said advancing track, a plurality of activatable friction rolls being disposed above said conveyor means immediately adjacent said starting position of said articles, and further comprising a transfer means below said friction rolls, said transfer means causing said articles to disengage said conveyor means and engage said activatable friction rolls, said transfer means abutting said articles by means of a plurality of loosely arranged resilient rolls.

9. An apparatus as claimed in claim 8, wherein said means is displaceably arranged on guides and is synchronously activated relative to said conveyor means by a connecting rod mechanism having a connecting rod comprising a cylinder-piston device for controlled regulation of a stroke of said transfer means in response to a sensor indication whether said article is correctly positioned in said starting position for advancement by said friction rolls.

* * * * *